W. COLE.
PROCESS OF MANUFACTURING BUTTER.
APPLICATION FILED JUNE 17, 1907.
961,483.
Patented June 14, 1910.
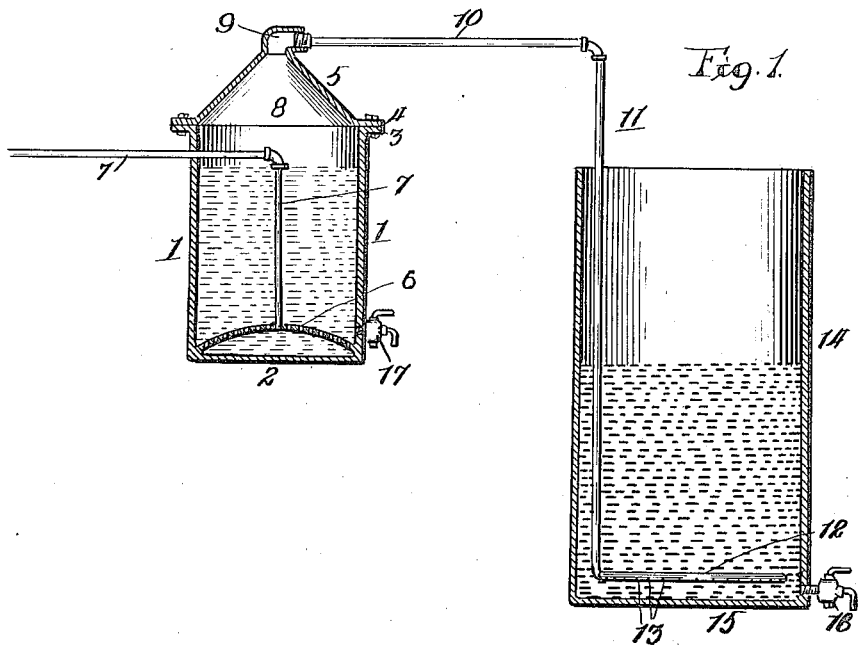
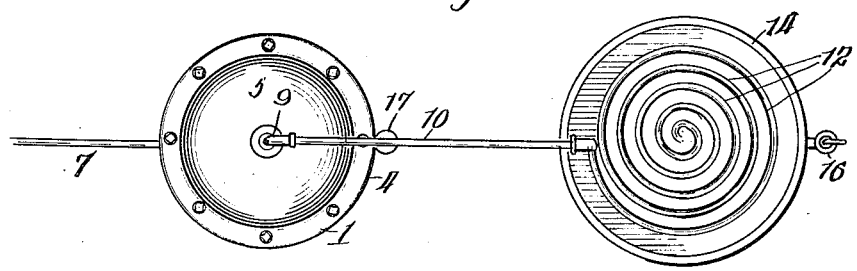
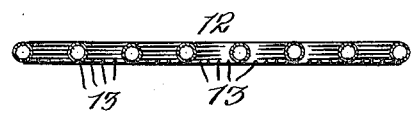
Witnesses
Wm. P. Bond
Pierson W. Banning
Inventor
Walter Cole
by Banning & Banning
Attys.

UNITED STATES PATENT OFFICE.

WALTER COLE, OF CHICAGO, ILLINOIS.

PROCESS OF MANUFACTURING BUTTER.

961,483.  Specification of Letters Patent.  Patented June 14, 1910.

Application filed June 17, 1907. Serial No. 379,387.

*To all whom it may concern:*

Be it known that I, WALTER COLE, a subject of the King of Great Britain, and a resident of Chicago, in the county of Cook and State of Illinois, have invented a certain new and useful Improvement in Processes of Manufacturing Butter, of which the following is a specification.

It is well known that in making butter, by means of fermentation and aeration, certain conditions must pertain to both the cream and the air, and for the best results the conditions must be under perfect control. One condition is that the cream should be in a state of natural lactic fermentation; and another condition is that, after the cream has reached the stage of natural lactic fermentation, it should be brought to and maintained at a temperature suitable for alcoholic fermentation. The natural lactic fermentation is a matter of course, and alcoholic fermentation will result from natural lactic fermentation, if the cream is raised to and maintained at and under proper conditions of temperature and aeration, but if alcoholic fermentation is not controlled at a certain stage so as not to extend beyond that stage, such fermentation will develop into putrefactive fermentation and spoil the cream for butter-making. It is, therefore, absolutely and positively essential that the alcoholic fermentation should be under perfect control; and the process of the present invention relates particularly to the absolute, positive and perfect control of the alcoholic fermentation.

The process of the present invention consists in allowing the cream to reach the stage of natural lactic fermentation, and then developing alcoholic fermentation by aeration under perfect control as to temperature of the cream and the admitted air, the temperature of the admitted air and cream being one that will maintain a suitable temperature for the cream, by which rapid alcoholic fermentation will be obtained in such manner as to so effect the by-products or constituents of the cream, other than the globules of butter fat, that their viscidity is destroyed, thus liberating the butter fat with its globules unbroken and the liberated butter fat will then of its own volition, owing to its less specific gravity than the other elements of the cream, rise to the top, where it can be washed and removed, and this without rupturing or destroying the inclosing sacs of the globules of butter fat, and without subjecting the cream to any action other than is produced by the air, in connection with a suitable temperature for the cream and the admitted air.

The carrying out of the process requires certain conditions, as to the temperature of the admitted air, for the oxygen of the air to properly act on the casein, sugar and other non-fatty solids of the cream, in order to transform the lactic into alcoholic fermentation, and this feature of injecting the air into the cream, with both the air and the cream under a proper temperature, and for maintaining the temperature of the cream at the point required for producing alcoholic fermentation, constitutes the essential step in carrying out the process of the present invention.

The cream, after the natural lactic fermentation has arisen, and in order to have such fermentation succeeded by rapid alcoholic fermentation, should be raised to and maintained at or about a temperature of 75 degrees Fahrenheit, at which temperature, under the present process, alcoholic fermentation of the cream will take place, and, in order to obtain rapid alcoholic fermentation, extraneous means must be employed for maintaining the temperature at or about 75 degrees, during the aeration treatment of the process, but such temperature, however, must not be maintained for too long a time, as the result would be the spoiling of the cream for the making of butter through the destroying or rupturing of the inclosing sacs of the butter globules. It is, therefore, necessary that the temperature for the alcoholic fermentation should be maintained for a short period of time only, say fifteen minutes, or thereabouts, and that this temperature for producing alcoholic fermentation should not be maintained for any longer period of time than the time during which alcoholic fermentation is taking place, and, hence, the necessity of a perfect control for the alcoholic fermentation is apparent. This perfect control of alcoholic fermentation is obtained under the present process in a reliable and effective manner, as follows: The temperature for alcoholic fermentation of the cream is maintained, during the stage of alcoholic fermentation, by admitting air to the cream at the bottom of the mass, for the air to pass upward through the body of the cream, causing a change to take place in the constituents of the cream other than the butter fat, by which the viscosity of the cream is destroyed and the butter globules will be liberated from the remaining elements of the cream, and such globules of butter fat will be in perfect condition with unbroken sacs and will rise to the top of the liquid, owing to their less specific gravity. The temperature of the air admitted to the bottom of the mass of cream must be higher than the temperature of 75 degrees, at which the cream is to be maintained for perfect alcoholic fermentation, to allow for the radiation of heat while under compression, but the temperature of the admitted air must not be so great as to cause the bursting of the butter globules thereby producing an oily substance or condition. The air admitted to the cream should enter the cream at a temperature of, approximately, 92 degrees Fahrenheit, which temperature, in the passage of the air through the cream, is one that will maintain the cream at the normal temperature of 75 degrees, approximately, for producing the condition of alcoholic fermentation, by which the necessary physical and chemical changes in the cream are performed to liberate the globules of butter fat, without churning or stirring the cream and without rupturing the sacs or envelops of the butter globules, which rupturing of the sacs or envelops should be guarded against, for if the sacs or envelops are ruptured or broken, the butter globules will be exposed to contamination from the fermentable elements of the cream.

The compression of the air, as to the amount of compression, must be regulated on the basis of the head of cream to be operated upon and the depth of water in the filter and heat transmitter, by which the temperature of the compressed air is raised, so that when delivered into the body of cream it will maintain a temperature of 75 degrees Fahrenheit, or thereabouts, for the cream, during the process of alcoholic fermentation. It is, therefore, necessary, in order to determine the amount of compression for the air, that the two factors of the head of cream, and the depth of water must be taken in consideration, for, just so much as the air is compressed, by the pump or blower to overcome the resistance of the head of cream and the water in the filter and heat transmitter, the temperature of the air will have to be more or less raised to compensate for the loss of temperature by radiation, while passing from the pump or blower through the connecting pipes by which the air is transmitted from the pump or blower to the filter and heat transmitter, and from the filter and heat transmitter to the receptacle containing the cream.

As an illustration, assuming that the air, when taken up by the pump or blower, is at a temperature of 60 degrees, and is compressed one-third, and while under compression and in passing through the pump or blower and the connecting pipes, it will lose, by radiation, the excess of temperature due to compression and on liberation within the cream will expand to its original bulk, thereby reducing its normal temperature to 40 degrees Fahrenheit, more or less, according to its environments, and inasmuch as alcoholic fermentation requires a temperature of 75 degrees Fahrenheit, or thereabout, it will be seen that an increase of 35 degrees more or less must be obtained, and this increasing of the temperature to an operative temperature of or about 75 degrees Fahrenheit, at which temperature alcoholic fermentation follows within the cream, and to positively and effectually control the temperature of the admitted air and the cream is the essence of the present invention, so as to have the temperature of the admitted air at a temperature which will maintain the cream at a temperature of about 75 degrees Fahrenheit, during the period of alcoholic fermentation. It is therefore necessary that the loss of heat by radiation, together with the difference in temperature between the air as first taken by the pump or blower, and the temperature required to maintain an alcoholic fermentation for the cream, must be compensated for, by raising the temperature, after the compressed air leaves the pump or blower, through extraneous means supplying a steady heat that will raise the compressed air to a higher temperature than delivered by the pump and which increase of temperature will be sufficient to account for the loss by radiation and difference in temperature; and to attain this end the process of the present invention raises the temperature of the air through the medium of a filter and heat transmitter interposed between the pump and the point of delivery of the air to the cream, which filter and heat transmitter has therein a body of water at a temperature to raise the temperature of the air to 80 degrees as the lowest point, and to 110 degrees, as the highest point, the same being the minimum and maximum points necessary to meet the average requirements in delivering the air, under pressure, to the cream at a temperature sufficiently high to maintain the temperature of the cream at the fermentation point of 75 degrees or thereabout, in effecting alcoholic fermentation.

The air, brought to the temperature between 80 and 110 degrees, whether 80 degrees or 110 degrees, or an intermediate temperature between the two, is admitted to the mass of cream, and the temperature should be maintained for the period of time during which alcoholic fermentation is proceeding in the cream, but should be reduced for the final separation of the butter globules. It is necessary to compress the air in carrying out the process, and the amount of compression will vary somewhat, according to the surrounding conditions and the resistance of the cream and water in the filter and heat transmitter. To illustrate, if the air from a normal temperature of 60 degrees was raised by compression to a temperature of, say 80 degrees, when discharged into the body of cream from the supply pipe, such temperature of 80 degrees would be too low for the air admitted or discharged into the mass of cream to maintain a working temperature of 75 degrees for the cream, and, therefore, must be raised. The raising of the temperature of the air is attained, in the present process, by passing the air in a confined state through water at a temperature, approximately, of 110 degrees, and confined in a filter and heat transmitter, so that the air, in its passage through the hot water, will be raised in temperature to an extent sufficient for admission into the mass of cream at a temperature of, approximately, 92 degrees, and this increase in the temperature of the air, by withdrawing the necessary heat from the hot water to raise the temperature of the air, will continue usually for only a short period of time, say fifteen minutes, which is the time ordinarily required for the alcoholic fermentation of the cream and the separation of the butter globules by the action of the oxygen carried into the cream by the admitted air. It will be understood that, as the heat is withdrawn from the water and transmitted to the air, the water will be gradually cooled down, causing a gradual reduction in the temperature of the air passing in a diffused state through the water, with the result that the air will be gradually reduced in temperature in its passage through the water, and such reduction of temperature follows its subsequent introduction into the mass of cream, so that, the final separation of the butter globules from the other elements of the cream will take place under a perfect condition of temperature of both the cream and the air, thus insuring a perfect separation of the globules of butter fat and the production of pure, clean and wholesome butter.

An apparatus suitable for carrying out the process of the present invention is illustrated in the drawings, in which—

Figure 1 is a sectional elevation of the filter and heat transmitter, and the receptacle for the cream, with the lead pipes in full elevation; Fig. 2 a top or plan view of the apparatus; and Fig. 3 a detail, in cross section, of the coil for discharging the air into the cream.

The apparatus, as shown, has a tank or vessel having a side wall 1 and a bottom 2, with a flange 3 at the upper end of the side wall. A flange 4 on a conical or funnel shaped cover 5 coincides with the flange 3, and the two flanges are secured together by suitable bolts, or otherwise, so as to unite the cover to the body or wall of the tank or vessel. The interior of the tank or vessel, adjacent to its bottom or lower end, has a perforated wall or diaphragm 6 on the arc of a circle, in the construction shown; and a supply pipe 7 leading from a compression pump or blower, not shown, enters the tank or vessel and is connected with and extends through the perforated wall or diaphragm, so as to discharge compressed air, or air under pressure, below the diaphragm. The tank or vessel is to be partly filled with hot water at the required temperature to increase the temperature of the compressed air, or air under pressure, supplied to the tank or vessel, and the interior of the body of the tank, with the interior of the cover, constitutes a chamber 8, into which the air, after passing through the body of water, is projected. The apex or top of the cover 5 has a discharge nozzle 9 of a sufficient capacity to furnish a free escape for the air from the chamber 8, and so as not to interfere with the passage of the air through the body of hot water, from back pressure of the air in the chamber. A lead pipe 10 is connected with the discharge nozzle 9, and this lead pipe in turn is connected with a lead pipe 11 entered into the interior of the receptacle for the cream, and connected at its lower end with a coil 12, having preferably, on the under side of each spiral of the coil, perforations 13, for escaping the air so as to enter the cream in jets, for the air to pass upward through the body of cream in the receptacle. The receptacle for the cream has a side wall 14, and a closed bottom 15, and preferably its top is open. A draw-off cock 16 is connected with the cream receptacle for drawing off the contents of the receptacle, after the globules of butter fat have been separated from the remaining constituents of the cream; and a draw-off cock 17 is connected with the tank or vessel for the hot water, for drawing off the water when required.

The operation of the apparatus is as follows: The receptacle for the cream is filled to approximately half its capacity, with the cream in a condition of natural lactic fermentation. The tank or receptacle is filled with water at a temperature of 110 degrees, or such lower temperature as may be required for increasing the temperature of the compressed air for delivery into the mass of cream at a temperature for the air to maintain a temperature of 75 degrees, or thereabout, for the cream during the period of alcoholic fermentation. Compressed air, or air under pressure, from the compression pump or blower, flows through the supply pipe 7 and is delivered into the water below the perforated wall or diaphragm 6 and escapes through the perforations of the wall or diaphragm in a multiplicity of streams or jets to flow up through the hot water in the tank or receptacle, which thus becomes a filter and heat transmitter for the air. The air, passing upward through the body of hot water, absorbs heat from the water, so as to raise the temperature of the compressed air, or air under pressure, to a sufficiently high temperature for final discharge into the body of the cream at the proper temperature. The air, escaping from the body of hot water, enters the chamber 8 and flows through the discharge nozzle 9 and lead pipes 10 and 11, and enters the coil 12 to escape or discharge downwardly into the body of the cream, through the perforations 13 on the lower side of the spirals of the coil. The downwardly discharged jets or streams of air at the proper temperature, escape upwardly and pass through the body of the cream, creating an agitation of the cream by which the globules of butter fat will be separated from the other constituents of the cream as hereinbefore described for the process of the invention. The effect of the discharged warm air, in its passage upwardly through the body of the cream, is to create alcoholic fermentation through the action of the oxygen in the air on the cream, and this alcoholic fermentation will produce a ferment, causing the cream to rise in the receptacle containing the same, and hence the necessity of only partially filling the receptacle with the cream.

The water, in the filter and heat transmitter, if of a temperature of 110 degrees, is adapted to receive compressed air, or air under pressure, having a temperature of 40 degrees, and by the passage of the air through the hot water the temperature of the air will be increased sufficiently for the loss of heat in passing through the transmission pipes into the coil, and so that the air will be delivered to the coil at a temperature of about 92 degrees, which temperature is required to maintain the temperature of the cream at about 75 degrees, for the production of alcoholic fermentation in the cream, by the aeration of the cream and the oxygen supplied from the air in its passage through the cream, and the aeration of the air and the supplied oxygen will act on the cream, when in a condition of natural lactic fermentation, to create alcoholic fermentation as required for the separation of the globules of butter fat from the remaining constituents of the cream. The absorption of heat from the hot water by the air passing through the body of hot water gradually reduces the temperature of the hot water, which causes a corresponding reduction of the temperature of the air ejected into the cream at the bottom from the coil, and this gradual reduction of the temperature of the air coincides with or corresponds to the gradual reduction required for the final completion of the process, as, at the final stage of the process, the temperature of the air and cream should be reduced, but, during the period of time in which alcoholic fermentation takes place, the temperature of the cream must be maintained at or about 75 degrees Fahrenheit, and the temperature should be steady and not fluctuating in order to operate practically and successfully. The treatment of the air, by passing the compressed air, or air under pressure, through a body of hot water having a temperature higher than the compressed air, or air under pressure, insures a steady and constant transmission of heat to increase the temperature of the air, and not a fluctuating heat, such as would be obtained by the use of a gas jet or other heating appliance, as the water gradually decreases in temperature as the heat of the water is transmitted to and absorbed by the air passing through the water to increase the temperature of the air. It will thus be seen that with the apparatus of the present invention a perfect, positive and reliable control of the temperature of the admitted air and the cream is obtained, under conditions of a steady and gradually decreasing temperature and not a fluctuating temperature for the air and cream.

The process of the present invention, and the apparatus for carrying out the same, enables the globules of butter fat to be separated from the other constituents of the cream, by destroying the viscidity of the cream so as to liberate the globules of butter fat unbroken and with the inclosed sacs intact; and when thus separated the globules of butter fat, owing to their less specific gravity, rise of their own volition to the top, where they can be washed and removed. The process of the present invention attains the end of employing air as the basis for making butter, with the air under the requisite temperature for maintaining a temperature of about 75 degrees during the action of alcoholic fermentation, making the process of obtaining butter from the cream a wholly chemical process without the necessity of employing any mechanical means for agitating the cream.

I do not confine myself to the exact method of controlling the temperature of the air as specified, for it is apparent that what I have discovered is the fact that the process, following the natural lactic ferment being one of alcoholic fermentation, the ferment can be exhausted in a few minutes by supplying air at a much higher temperature than the temperature of the cream and higher than that required for the secondary ferment; and that if this high temperature were maintained, after the secondary ferment is complete, the resulting butter would be spoiled; and that it is necessary to reduce the temperature as soon as the secondary ferment is complete and continue the action of the air at a lower temperature to enable the globules of butter to agglomerate; and it will be seen that the mechanical working out of the invention may be accomplished in many ways.

What I claim as new and desire to secure by Letters Patent is:

1. The method of producing butter, which consists in treating cream when in a state of lactic fermentation to a current of air at a temperature to produce alcoholic fermentation, and in automatically reducing the temperature of the air during such fermentation, substantially as described.

2. The method of producing butter, which consists in treating cream when in a state of lactic fermentation to a current of air at a temperature to produce alcoholic fermentation, the temperature of said current of air being automatically reduced during such treatment by passage through a body of water which gradually cools, substantially as described.

3. In a device for the manufacture of butter, the combination of a tank for containing water, means for passing a current of air through said water, an air connection from said tank to a fermentation chamber, and means for causing the air to pass up through the liquid in the fermentation chamber, substantially as described.

4. In a device for the manufacture of butter, the combination of a water tank, means for passing a current of air through the water in said tank, thereby raising the temperature of the air to that of the water, an air connection from said water tank to the fermentation chamber, and means for causing the air to pass up through the liquid in the fermentation chamber, substantially as described.

WALTER COLE.

Witnesses:
 OSCAR W. BOND,
 WALKER BANNING.